US010073854B2

(12) United States Patent
Kalach et al.

(10) Patent No.: US 10,073,854 B2
(45) Date of Patent: *Sep. 11, 2018

(54) DATA DEDUPLICATION IN A VIRTUALIZATION ENVIRONMENT

(71) Applicant: Microsoft Technology Licensing, LLC, Redmond, WA (US)

(72) Inventors: Ran Kalach, Bellevue, WA (US); Paul Adrian Oltean, Redmond, WA (US); Cristian G. Teodorescu, Seattle, WA (US); Mathew James Dickson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,027

(22) Filed: May 15, 2016

(65) Prior Publication Data

US 2016/0267100 A1    Sep. 15, 2016

Related U.S. Application Data

(63) Continuation of application No. 14/594,143, filed on Jan. 11, 2015, now Pat. No. 9,342,244, which is a
(Continued)

(51) Int. Cl.
*G06F 12/00* (2006.01)
*G06F 17/30* (2006.01)
(Continued)

(52) U.S. Cl.
CPC ........ *G06F 17/30159* (2013.01); *G06F 3/064* (2013.01); *G06F 3/0604* (2013.01);
(Continued)

(58) Field of Classification Search
CPC ...... G06F 3/0608; G06F 3/0638; G06F 3/064; G06F 3/0641; G06F 11/1446; G06F 11/1448; G06F 11/1453
(Continued)

(56) References Cited

U.S. PATENT DOCUMENTS 7,636,801 B1   12/2009   Kekre et al.
7,739,312 B2   6/2010   Gordon et al.
(Continued)

FOREIGN PATENT DOCUMENTS

CN    101663654 A    3/2010
WO    2010103569 A1   9/2010

OTHER PUBLICATIONS

"Final Office Action Issued in U.S. Appl. No. 12/967,984", dated Mar. 24, 2014, 29 Pages.
(Continued)

*Primary Examiner* — Prasith Thammavong
(74) *Attorney, Agent, or Firm* — Wade IP Law LLC

(57) ABSTRACT

Techniques are described herein that are capable of optimizing (i.e., deduplicating) data in a virtualization environment. For example, optimization designations (a.k.a. deduplication designations) may be assigned to respective regions of a virtualized storage file. A virtualized storage file is a file that is configured to be mounted as a disk or a volume to provide a file system interface for accessing hosted files. In accordance with this example, each optimization designation indicates an extent to which the respective region is to be optimized (i.e., deduplicated). In another example, a virtualized storage file is mounted to provide a virtual disk that includes hosted files. In accordance with this example, optimization designations are assigned to the respective hosted files. In further accordance with this
(Continued)

example, each optimization designation indicates an extent to which the respective hosted file is to be optimized.

20 Claims, 7 Drawing Sheets

Related U.S. Application Data continuation of application No. 12/967,984, filed on Dec. 14, 2010, now Pat. No. 8,959,293.

(51) Int. Cl.
  *G06F 11/14* (2006.01)
  *G06F 3/06* (2006.01)
  *G06F 9/455* (2018.01)

(52) U.S. Cl.
  CPC .......... *G06F 3/0608* (2013.01); *G06F 3/0638* (2013.01); *G06F 3/0641* (2013.01); *G06F 3/0665* (2013.01); *G06F 3/0683* (2013.01); *G06F 9/45558* (2013.01); *G06F 11/1446* (2013.01); *G06F 11/1448* (2013.01); *G06F 11/1453* (2013.01); *G06F 17/30082* (2013.01); *G06F 17/30085* (2013.01); *G06F 17/30233* (2013.01); *G06F 2009/45579* (2013.01)

(58) Field of Classification Search
  USPC ........................................................ 711/154
  See application file for complete search history.

(56) References Cited

U.S. PATENT DOCUMENTS

| | | | |
|---|---|---|---|
| 7,818,495 | B2 | 10/2010 | Tanaka et al. |
| 8,447,740 | B1 | 5/2013 | Huang et al. |
| 8,799,223 | B1 | 8/2014 | Karmarkar et al. |
| 2004/0068627 | A1 | 4/2004 | Sechrest et al. |
| 2006/0112251 | A1 | 5/2006 | Karr et al. |
| 2007/0088690 | A1 | 4/2007 | Wiggen et al. |
| 2007/0136245 | A1 | 6/2007 | Hess et al. |
| 2007/0250552 | A1 | 10/2007 | Lango et al. |
| 2008/0005201 | A1 | 1/2008 | Ting et al. |
| 2008/0154985 | A1 | 6/2008 | Childs et al. |
| 2008/0244577 | A1 | 10/2008 | Le et al. |
| 2010/0042790 | A1 | 2/2010 | Mondal et al. |
| 2010/0070544 | A1 | 3/2010 | Gopalan et al. |
| 2010/0082700 | A1 | 4/2010 | Parab |
| 2010/0088349 | A1 | 4/2010 | Parab |
| 2010/0121825 | A1 | 5/2010 | Bates et al. |
| 2010/0161909 | A1 | 6/2010 | Nation et al. |
| 2010/0251172 | A1* | 9/2010 | Oxrieder ............. G06F 11/1438 715/810 |
| 2010/0268927 | A1* | 10/2010 | De Ven ................. G06F 9/4406 713/2 |
| 2011/0029739 | A1 | 2/2011 | Nakajima et al. |
| 2011/0218969 | A1 | 9/2011 | Anglin et al. |

OTHER PUBLICATIONS

"Non-Final Office Action Issued in U.S. Appl. No. 12/967,984", dated Sep. 13, 2013, 28 Pages.
"Notice of Allowance Issued in U.S. Appl. No. 12/967,984", dated Sep. 29, 2014, 23 Pages.
"Final Office Action Issued in U.S. Appl. No. 14/594,143", dated Oct. 8, 2015, 11 Pages.
"Non-final Office Action Issued in U.S. Appl. No. 14/594,143", dated Feb. 27, 2015, 25 Pages.
"Notice of Allowance Issued in U.S. Appl. No. 14/594,143", dated Jan. 22, 2016, 11 Pages.
"Final Office Action Issued in Chinese Patent Application No. 201110436633.3", dated Feb. 15, 2015, 8 Pages.
"First Office Action and Search Issued in Chinese Patent Application No. 201110436633.3", dated Mar. 4, 2014, 12 Pages.
"Notice of Reexamination Issued in Chinese Patent Application No. 201110436633.3", dated Nov. 25, 2015, 7 pages.
"Second Office Action and Search Report Issued in Chinese Patent Application No. 201110436633.3", dated Sep. 5, 2014, 9 Pages.
Jin, et al., "The Effectiveness of Deduplication on Virtual Machine Disk Images", In Proceedings of SYSTOR 2009: The Israeli Experimental Systems Conference, Article No. 7, May 4, 2009, 12 Pages.
"International Search Report & Written Opinion Issued in PCT Application No. PCT/US2011/064509", dated Jul. 24, 2012, 8 Pages.
Soltesz, et al., "Container-Based Operating System Virtualization: A Scalable, High-Performance Alternative to Hypervisors", In Proceedings of the 2nd ACM SIGOPS/EuroSys European Conference on Computer Systems 2007, Mar. 21, 2007, 14 Pages.
"Third Office Action Issued in Chinese Patent Application No. 201110436633.3", dated Jun. 1, 2016, 7 Pages.
"Office Action Issued in Chinese Patent Application No. 201110436633.3", dated Apr. 28, 2016, 12 Pages.
"Search Report Issued in European Patent Application No. 11849494.7", dated Jun. 22, 2017, 7 Pages.
"Office Action Issued in European Patent Application No. 11849494.7", dated Mar. 20, 2018, 7 Pages.

* cited by examiner

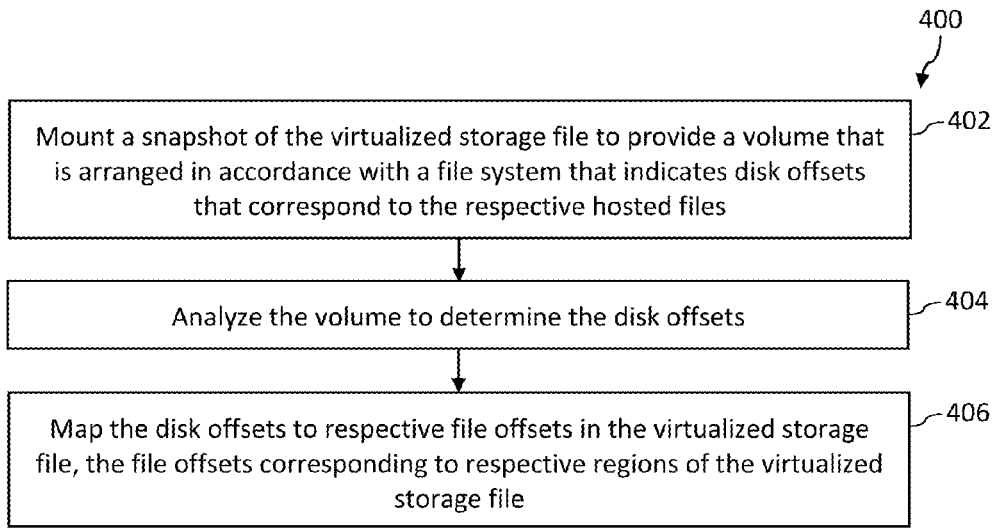
FIG. 4
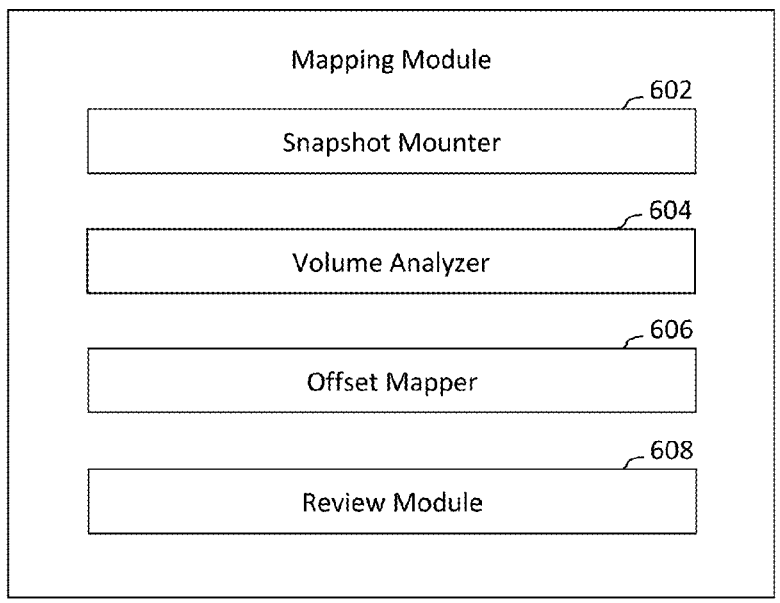
FIG. 5
FIG. 6

DATA DEDUPLICATION IN A VIRTUALIZATION ENVIRONMENT

CROSS-REFERENCE TO RELATED APPLICATION(S)

This application is a continuation of U.S. patent application Ser. No. 14/594,143, filed Jan. 11, 2015, which is a continuation of U.S. patent application Ser. No. 12/967,984 (now U.S. Pat. No. 8,959,293), filed Dec. 14, 2010, the entireties of which are incorporated by reference herein.

BACKGROUND

Data deduplication, also known as data optimization is the act of reducing the physical amount of bytes of data which need to be stored on disk or transmitted across a network without compromising the fidelity or integrity of the original data. Data deduplication reduces the storage capacity needed to store data, and may therefore lead to savings in terms of storage hardware costs and data management costs. Data deduplication provides a solution for handling the rapid growth of digitally stored data.

Data deduplication may be performed according to one or more techniques to eliminate redundancy within and between persistently stored files. For instance, according to one technique, unique regions of data that appear multiple times in one or more files may be identified, and a single copy of those identified unique regions of data may be physically stored. References to those identified unique regions of data (also referred to as data "chunks") may be stored to indicate the files, and the locations in the files, that include them. This technique is commonly referred to as single instancing. Compression of data may be performed in addition to single instancing. Other data reduction techniques may also be implemented as part of a data deduplication solution.

Optimized data in this specification refers to data that has been optimized, or deduplicated, by one or more data deduplication techniques such as single-instancing of chunks and compression. Optimized streams refer to streams that were deduplicated, or in other words, their data was optimized using data deduplication techniques.

Once data is optimized, the data may be accessed by reversing the effects of the optimization (i.e., de-optimizing the optimized data), for example by performing an inverse dedup operation and/or a decompression operation with respect to the optimized data. However, de-optimization causes a delay with respect to accessing the data. A greater amount of data results in a longer latency. Moreover, such latency may occur each time the data is accessed unless a de-optimized version of the data is stored for access on a storage device. Furthermore, de-optimization often consumes substantial resources (e.g., memory, central processing unit (CPU), disk I/O, etc.) of a device, which may negatively affect a main workload that is running on the device. Accordingly, frequent de-optimization may result in relatively inefficient utilization of the device's resources.

Storage virtualization is the act of abstracting logical storage from physical storage, such that data that is stored with respect to the physical storage may be accessed via the logical storage without regard to the structure of the physical storage. For example, a host device may execute one or more virtual machine instances. In accordance with this example, the host device may emulate disks to the virtual machine instance(s). The emulated disks are stored as files on the physical storage of the host device. In another example, a host device may execute a driver that presents a virtual disk to the operating system of the host device. In accordance with this example, the virtual disk is presented by mounting a file that is stored on the physical storage of the host device. Files that are mounted to emulate disks (i.e., to present virtual disks) are referred to as virtualized storage files.

Systems that utilize data optimization may be characterized by relatively low hardware (e.g., storage) costs and/or relatively low data management (e.g., backup) costs. However, when data optimization is performed in a virtualized environment, issues commonly arise. For example, if the data in a virtualized storage file is fully optimized, the latency that is associated with accessing the data may unduly degrade the performance of a host device, especially if regions of the virtualized storage file are frequently accessed. In another example, it may not be desirable to optimize some files that are stored in a virtual disk due to sensitivity of the files and/or the type of data that they include. In a non-virtualized environment, this issue may be resolved by applying a policy based on the files. However, in a virtualized environment, the files are located in a virtualized storage file and are therefore not visible to the host device. A host device typically has no way to know whether regions of a virtualized storage file are not optimizable.

SUMMARY

Various approaches are described herein for, among other things, optimizing (i.e., deduplicating) data in a virtualization environment. For example, optimization designations (a.k.a. deduplication designations) may be assigned to respective regions of a virtualized storage file or to respective hosted files that are included in a virtual disk that is provided as a result of mounting the virtualized storage file. A virtualized storage file is a file that is configured to be mounted as a disk or a volume to provide a file system interface for accessing hosted files. In accordance with this example, each optimization designation indicates an extent to which the respective region or the respective hosted file is to be optimized (i.e., deduplicated).

An example method is described in which a virtualized storage file is mounted to provide a virtual disk that includes multiple hosted files. Each hosted file is mapped to one or more regions of the virtualized storage file. An optimization designation is assigned to each region based on at least one property of the hosted file that is mapped to that region. Each optimization designation indicates an extent to which the respective region is to be optimized. Each region is optimized to the extent that is indicated by the respective optimization designation that is assigned to that region.

Another example method is described in which a virtualized storage file is mounted to provide a virtual disk that includes hosted files. Optimization designations are assigned to the respective hosted files. Each optimization designation is assigned to the respective hosted file based on at least one property of that hosted file. Each optimization designation indicates an extent to which a respective hosted file is to be optimized.

Yet another example method is described in which optimization designations are assigned to respective regions of a virtualized storage file. The regions correspond to respective file offsets (a.k.a. virtualized storage file offsets) in the virtualized storage file. Each optimization designation is assigned to the respective region based on at least one property of a hosted file that is mapped to the respective file offset that corresponds to that region. Each optimization designation indicates an extent to which the respective region is to be optimized. Each region is optimized to the extent that is indicated by the respective optimization designation that is assigned to that region.

An example system is described that includes a mounting module, a mapping module, an assignment module, and an optimization module. The mounting module is configured to mount a virtualized storage file to provide a virtual disk that includes multiple hosted files. The mapping module is configured to map each hosted file to one or more regions of the virtualized storage file. The assignment module is configured to assign an optimization designation to each region based on at least one property of the hosted file that is mapped to that region. Each optimization designation indicates an extent to which the respective region is to be optimized. The optimization module is configured to optimize each region to the extent that is indicated by the respective optimization designation that is assigned to that region.

Another example system is described that includes a mounting module and an assignment module. The mounting module is configured to mount a virtualized storage file to provide a virtual disk that includes hosted files. The assignment module is configured to assign optimization designations to the respective hosted files. Each optimization designation is assigned to the respective hosted file based on at least one property of that hosted file. Each optimization designation indicates an extent to which a respective hosted file is to be optimized.

Yet another example system is described that includes an assignment module and an optimization module. The assignment module is configured to assign optimization designations to respective regions of a virtualized storage file. The regions correspond to respective file offsets in the virtualized storage file. Each optimization designation is assigned to the respective region based on at least one property of a hosted file that is mapped to the respective file offset that corresponds to that region. Each optimization designation indicates an extent to which the respective region is to be optimized. The optimization module is configured to optimize each region to the extent that is indicated by the respective optimization designation that is assigned to that region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example host device in accordance with an embodiment.

FIGS. 2, 4, 5, and 7-9 depict flowcharts of example methods for optimizing data in a virtualization environment in accordance with embodiments.

FIG. 6 is a block diagram of an example implementation of a mapping module shown in FIG. 3 in accordance with an embodiment.

Figure 1:
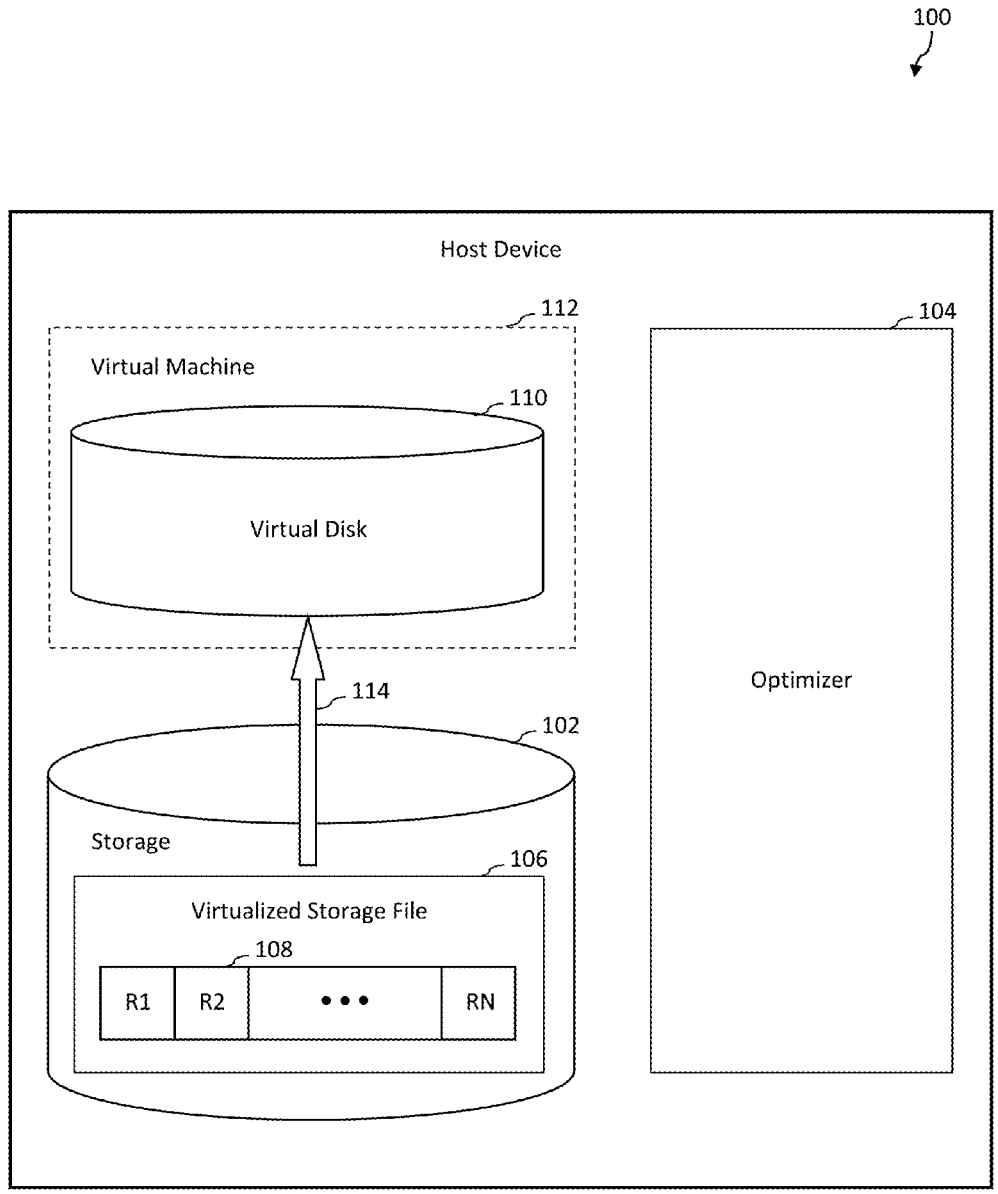

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of optimizing (i.e., deduplicating) data in a virtualization environment. In some example embodiments, optimization designations (a.k.a. deduplication designations) are assigned to respective regions of a virtualized storage file. A virtualized storage file is a file that is configured to be mounted as a disk or a volume to provide a file system interface for accessing hosted files. In accordance with these example embodiments, each optimization designation indicates an extent to which the respective region is to be optimized (i.e., deduplicated). Each region may be optimized to the extent that is indicated by the respective optimization designation that is assigned to that region.

In other example embodiments, a virtualized storage file is mounted to provide a virtual disk that includes hosted files. For instance, mounting the virtualized storage file may enable an operating system that is executing on a host device to recognize logical volumes, hosted files, and/or file systems that are associated with the virtual disk. Hosted files are files that are stored on a virtual disk based on a virtualized storage file. In accordance with these example embodiments, optimization designations are assigned to the respective hosted files to indicate extents to which the respective hosted files are to be optimized.

Optimization designations may be defined in any suitable manner. For instance, a first optimization designation may indicate that a first region of a virtualized storage file or a first hosted file is to be compressed but not deduplicated. A second optimization designation may indicate that a second region or a second hosted file is to be deduplicated but not compressed. A third optimization designation may indicate that a third region or a third hosted file is to be compressed and deduplicated. A fourth optimization designation may indicate that a fourth region or a fourth hosted file is to be neither compressed nor deduplicated. Fifth and sixth optimization designations may indicate that fifth and sixth regions or fifth and sixth hosted files are to be compressed using respective first and second compression techniques. Seventh and eighth optimization designations may indicate that seventh and eighth regions or seventh and eighth hosted files are to be deduplicated using respective first and second deduplication techniques, and so on.

In an example embodiment, each optimization designation indicates a respective optimization policy (i.e., deduplication policy) or a respective optimization level (i.e., deduplication level) within a global policy. An optimization policy is a set of rules that defines a manner in which hosted files or regions of a virtualized storage file are to be optimized based on designated criteria. The optimization policy may define multiple optimization levels. Each optimization level indicates one or more data optimization (i.e., data deduplication) techniques that are to be performed with respect to the hosted files or regions that satisfy a respective subset of the designated criteria. For example, a first optimization level may indicate that no optimization is to be performed with respect to hosted files or regions that are associated with the first optimization level. The extent to which a hosted file or a region is optimized may increase as the optimization level that is associated with the hosted file or the region increases. In accordance with this example, increasing an optimization level that is associated with a hosted file or a region may increase storage savings but may consume more computational resources and/or add latency to data access operations that are performed with respect to the hosted file or the region. It will be recognized that an optimization designation that indicates an optimization policy may further indicate an optimization level that is defined by that optimization policy.

Example techniques described herein have a variety of benefits as compared to conventional techniques for optimizing data in a virtualized environment. For instance, some example techniques may optimize the various regions of a virtualized storage file or various hosted files to different degrees. Some example techniques may partially optimize a virtualized storage file, meaning that one or more regions of the virtualized storage file are not optimized. An extent to which the regions of a virtualized storage file are optimized may be based on any of a variety of factors, including but not limited to access patterns regarding the regions or regarding hosted files that correspond to the regions, latencies that are associated with accessing the regions or the hosted files that correspond to the regions, the type(s) of data that are stored in hosted files that correspond to the regions, classification(s) of the hosted files, the intended uses of the hosted files, other characteristics that are associated with the hosted files, etc. Some example techniques may consume less time and/or fewer resources of a host device than conventional techniques. For instance, example techniques that utilize incremental optimization may reduce the time and/or the amount of resources that are used for subsequent optimizations regarding a region once the region is initially optimized.

FIG. 1 is a block diagram of an example host device 100 in accordance with an embodiment. Host device 100 is a processing system that is capable of mounting a virtualized storage file to provide a virtual disk. An example of a processing system is a system that includes at least one processor that is capable of manipulating data in accordance with a set of instructions. For instance, a processing system may be a computer, a personal digital assistant, etc.

Host device 100 includes storage 102 and an optimizer 104. Storage 102 stores a virtualized storage file 106. Virtualized storage file 106 includes multiple regions 108. Regions 108 may be defined based on access patterns that are associated with the regions 108, offsets (a.k.a. virtualized storage file offsets) in virtualized storage file 106 that correspond to hosted files that are stored on a virtual disk (e.g., virtual disk 110), and/or any other suitable factor(s). For instance, an access pattern may include a time at which a region was most recently accessed, a number of times that the region is accessed, a frequency with which the region is accessed, a time at which the region was most recently modified, a number of times that the region is modified, a frequency with which the region is modified, etc. The number of bits in each region may be based on any of a variety of factors, including but not limited to an average number of bits included in hosted files that correspond to the regions, an amount of memory that is available for tracking the regions, etc. The number of bits in each region may be the same or different. The number of bits in each region may be fixed or variable.

Regions 108 are shown to be arranged as a vector of N regions (labeled as R1, R2, . . . , RN) for illustrative purposes and are not intended to be limiting. It will be recognized that virtualized storage file 106 may include any suitable number and/or configuration of regions.

Optimizer 104 is configured to optimize (i.e., deduplicate) regions 108 of virtualized storage file 106 or hosted files that correspond to the regions 108 based on optimization designations (a.k.a. deduplication designations) that are assigned to the regions 108 or the hosted files, respectively. The optimization designations may be based on properties of the hosted files and/or any other suitable factor(s). Example properties of a hosted file include but are not limited to an access pattern of the hosted file, a latency that is associated with accessing the hosted file, heuristics regarding the hosted file, a classification of the hosted file, a format of the hosted file, a type of the hosted file, an intended use of the hosted file (e.g., whether the hosted file is to be used to execute virtual machine 112 and/or during a system boot operation with regard to host device 100 and/or another virtual machine), etc. Example formats of a hosted file include but are not limited to an Adobe® PDF format, a Microsoft® Office (e.g., Word®, Excel®, Visio®, etc.) format, a WordPerfect® format, an extensible markup language (XML) format, etc.

In some example embodiments, optimizer 104 is capable of mounting virtualized storage file 106 to provide virtual disk 110, as indicated by arrow 114. Virtual disk 110 is shown in FIG. 1 to be mounted on a virtual machine 112, which is configured to execute on host device 100. It will be recognized, however, that virtual disk 110 may be mounted on host device 100, rather than on virtual machine 112. For example, host device 100 need not necessarily include virtual machine 112. Mounting virtualized storage file 106 on host machine 100 or virtual disk 110 may enable optimizer 104 to recognize virtual disk 110 as storage, rather than as a file. For instance, mounting virtualized storage file 106 may enable optimizer 104 to determine logical volume(s) and/or file system(s) that are associated with virtual disk 110 for purposes of optimizing regions 108 or hosted files that are included in virtual disk 110. Techniques for optimizing regions (e.g., regions 108) and/or hosted files are described in detail below with reference to FIGS. 2-10.

Figure 2:
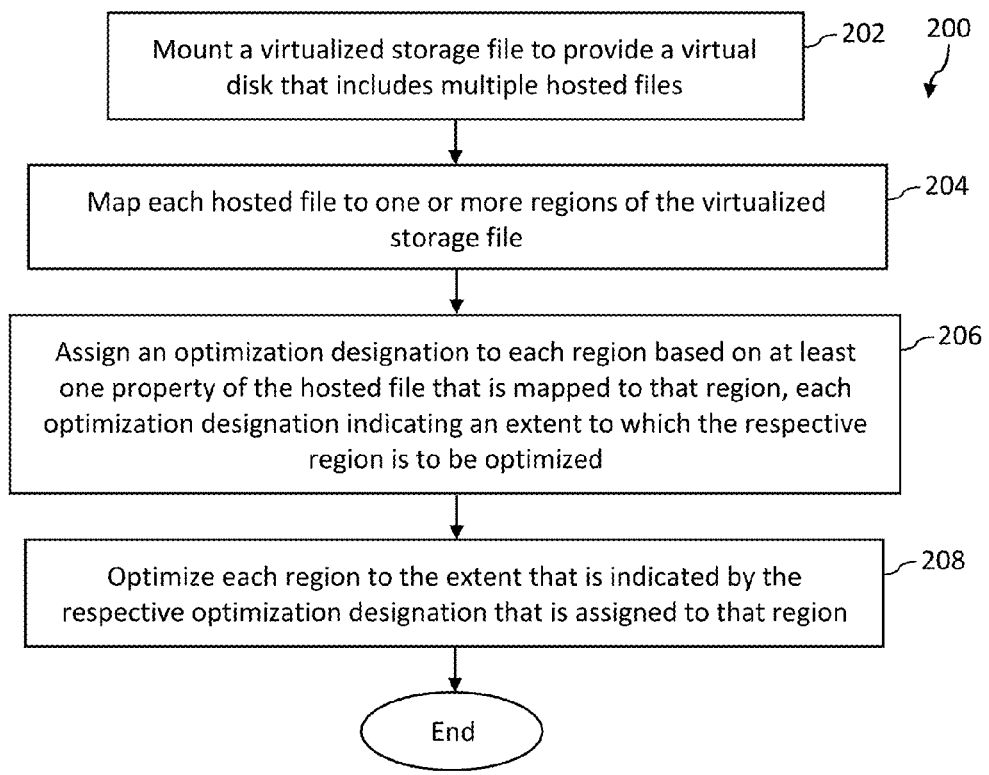
Figure 3:
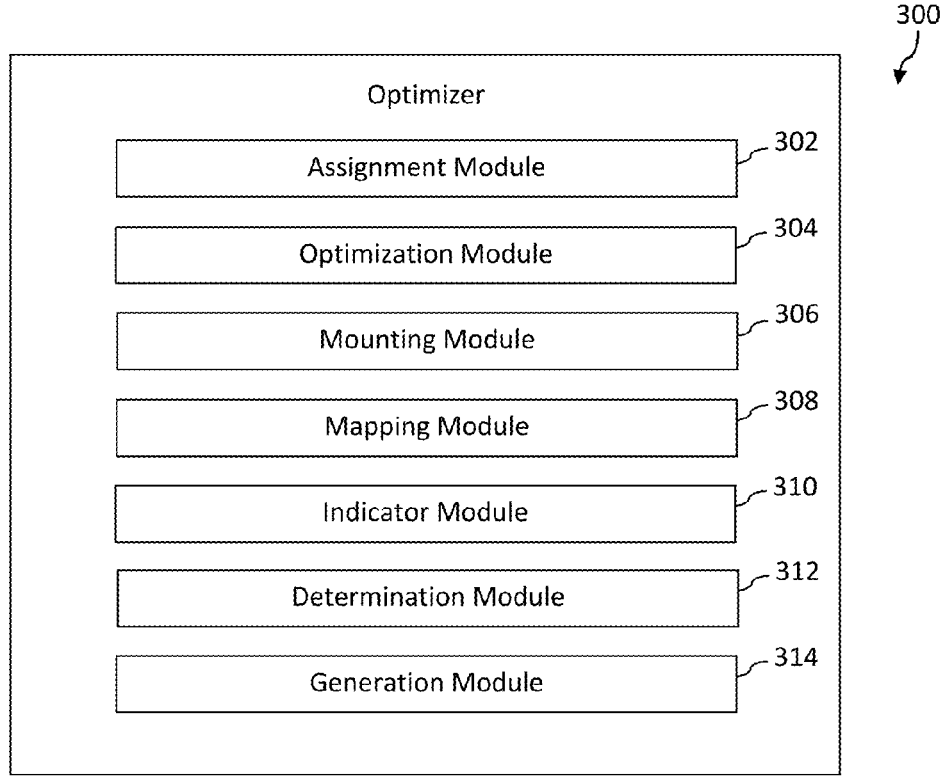
FIG. 3 is a block diagram of an example implementation of an optimizer shown in FIG. 1 in accordance with an embodiment.

FIG. 2 depicts a flowchart 200 of an example method for optimizing (i.e., deduplicating) data in a virtualization environment in accordance with an embodiment. Flowchart 200 may be performed by optimizer 104 of host device 100 shown in FIG. 1, for example. For illustrative purposes, flowchart 200 is described with respect to an optimizer 300 shown in FIG. 3, which is an example of an optimizer 104, according to an embodiment. As shown in FIG. 3, optimizer 300 includes an assignment module 302, an optimization module 304, a mounting module 306, a mapping module 308, an indicator module 310, a determination module 312, and a generation module 314. Further structural and operational embodiments will be apparent to persons skilled in the relevant art(s) based on the discussion regarding flowchart 200. It will be recognized that any one or more of assignment module 302, optimization module 304, mounting module 306, mapping module 308, indicator module 310, determination module 312, and/or generation module 314 may be implemented in virtual machine 112.

As shown in FIG. 2, the method of flowchart 200 begins at step 202. In step 202, a virtualized storage file is mounted to provide a virtual disk that includes multiple hosted files. In an example implementation, mounting module 306 mounts the virtualized storage file to provide the virtual disk.

At step 204, each hosted file is mapped to one or more regions of the virtualized storage file. In an example implementation, mapping module 308 maps each hosted file to one or more regions of the virtualized storage file.

At step 206, an optimization designation is assigned to each region based on at least one property of the hosted file that is mapped to that region. Each optimization designation indicates an extent to which the respective region is to be optimized (i.e., deduplicated). For instance, each optimization designation may indicate a respective optimization policy (i.e., deduplication policy) and/or optimization level (i.e., deduplication level) in an optimization policy. The optimization designation may be assigned to each region in accordance with a heuristic technique, though the scope of the example embodiments is not limited in this respect. In an example implementation, assignment module 302 assigns the optimization designations to the respective regions.

In an example embodiment, an optimization designation is assigned to each region based on a number of times that the hosted file that is mapped to that region is accessed, a frequency with which the hosted file that is mapped to that region is accessed, a time at which the hosted file that is mapped to that region is most recently accessed, a number of times that the hosted file that is mapped to that region is modified, a frequency with which the hosted file that is mapped to that region is modified, a time at which the hosted file that is mapped to that region is most recently modified, a latency that is associated with accessing the hosted file that is mapped to that region, and/or any combination thereof. Each frequency, time, number of times, and/or latency may be determined with respect to any suitable period of time (e.g., since creation of the hosted file or in a designated time interval).

In another example embodiment, an optimization designation is assigned to each region based on a classification of the hosted file that is mapped to that region. For example, one or more of the hosted files may be classified as being "on hold", meaning that those hosted file(s) are not to be optimized due to compliance regulations. In another example, the classification of each hosted file may reflect a priority that is associated with that hosted file. In accordance with this example, a relatively greater priority may correspond to a relatively lesser extent of optimization, and a relatively lesser priority may correspond to a relatively greater extent of optimization. In one aspect, the priority of a hosted file may be based on a title or rank of the creator of the hosted file. In accordance with this aspect, a hosted file that is created by a vice president of a company may be associated with a greater priority than a hosted file that is created by an entry-level worker of the company.

In yet another example embodiment, an optimization designation is assigned to each region based on a format of the hosted file that is mapped to that region. Example formats of a hosted file include but are not limited to an Adobe® PDF format, a Microsoft® Office (e.g., Word®, Excel®, Visio®, etc.) format, a WordPerfect® format, an extensible markup language (XML) format, etc.

In another example embodiment, an optimization designation is assigned to each region based on an intended use of the hosted file that is mapped to that region. For example, an optimization designation may be assigned to each region based on whether the hosted file that is mapped to that region is configured to be used in a system boot operation with respect to a host device (e.g., host device 100) and/or a virtual machine (e.g., virtual machine 112). In another example, an optimization designation may be assigned to each region based on whether the hosted file that is mapped to that region is configured to be used to execute a virtual machine.

In still another example embodiment, an optimization designation is assigned to each region based on whether the hosted file that is mapped to that region is a temporary file. A temporary file is a file that is created to temporarily store information in order to free memory for other purposes and/or in order to mitigate or prevent loss of data when a software program performs a specified operation.

At step 208, each region is optimized (i.e., deduplicated) to the extent that is indicated by the respective optimization designation that is assigned to that region. In an example implementation, optimization module 304 optimizes each region.

In some example embodiments, one or more steps 202, 204, 206, and/or 208 of flowchart 200 may not be performed. Moreover, steps in addition to or in lieu of steps 202, 204, 206, and/or 208 may be performed.

It will be recognized that optimizer 300 may not include one or more of assignment module 302, optimization module 304, mounting module 306, mapping module 308, indicator module 310, determination module 312, and/or generation module 314. Furthermore, optimizer 300 may include modules in addition to or in lieu of assignment module 302, optimization module 304, mounting module 306, mapping module 308, indicator module 310, determination module 312, and/or generation module 314. Indicator module 310 is described below with reference to flowchart 800 of FIG. 8. Determination module 312 and generation module 314 are described below with reference to flowchart 700 of FIG. 7.

FIGS. 4 and 5 depict flowcharts 400 and 500 that show example ways to implement step 204 of flowchart 200 in FIG. 2 in accordance with an embodiment. Flowcharts 400 and 500 may be performed by mapping module 308 of optimizer 300 shown in FIG. 3, for example. For illustrative purposes, flowcharts 400 and 500 are described with respect to a mapping module 600 shown in FIG. 6, which is an example of a mapping module 308, according to an embodiment. As shown in FIG. 6, mapping module 600 includes a snapshot mounter 602, a volume analyzer 604, an offset mapper 606, and a review module 608. Further structural and operational embodiments will be apparent to persons skilled in the relevant art(s) based on the discussion regarding flowcharts 400 and 500.

As shown in FIG. 4, the method of flowchart 400 begins at step 402. In step 402, a snapshot of the virtualized storage file is mounted to provide a volume that is arranged in accordance with a file system that indicates disk offsets that correspond to the respective hosted files. A snapshot of a virtualized storage file is configured to appear as a copy of the virtualized storage file with respect to an instance of time, though the snapshot need not necessarily be an actual copy of the virtualized storage file. In an example implementation, snapshot mounter 602 mounts the snapshot of the virtualized storage file to provide the volume.

In an example embodiment, the snapshot is mounted on a host device. For example, the snapshot may be mounted on the host device, and the virtualized storage file may be mounted on a virtual machine that is executing on the host device. In another example, the snapshot and the virtualized storage file may be mounted on the host device.

At step 404, the volume is analyzed to determine the disk offsets. In an example implementation, volume analyzer 604 analyzes the volume to determine the disk offsets.

At step 406, the disk offsets are mapped to respective file offsets in the virtualized storage file. The file offsets correspond to respective regions of the virtualized storage file. In an example implementation, offset mapper 606 maps the disk offsets to the respective file offsets in the virtualized storage file.

As shown in FIG. 5, the method of flowchart 500 includes step 502. In step 502, an on-disk format of a file system that is associated with the virtual disk is reviewed to obtain (e.g., locate and/or retrieve) metadata that indicates that each hosted file corresponds to one or more file offsets in the virtualized storage file. The file offsets correspond to respective regions of the virtualized storage file. In an example implementation, review module 608 reviews the on-disk format of the file system that is associated with the virtual disk to obtain the metadata.

In an example embodiment, the file system is a New Technology File System (NTFS), and the on-disk format is associated with a master file table (MFT) that is included in the NTFS. An MFT is a file that includes at least one entry for each hosted file that is included in a volume of the NTFS. Information about each hosted file, including but not limited to the size, time and date stamps, permissions, data content, and/or aforementioned metadata of the hosted file, is stored in one or more MFT entries or in a space outside the MFT that is described by one or more MFT entries. Accordingly, the metadata may be obtained from the MFT or from a space that is described by the MFT.

It will be recognized that mapping module 600 may not include one or more of snapshot mounter 602, volume analyzer 604, offset mapper 606, and/or review module 608. Furthermore, mapping module 600 may include modules in addition to or in lieu of snapshot mounter 602, volume analyzer 604, offset mapper 606, and/or review module 608.

In some example embodiments, each region of a virtualized storage file is incrementally optimized to the extent that is indicated by the respective optimization designation that is assigned to that region. For example, an optimizer (e.g., optimizer 104) may monitor the regions to determine changes with respect to the regions since the most recent optimization of the regions. In accordance with this example, the optimizer may create a differential file (a.k.a. difference file) that includes the changes. For instance, the optimizer may optimize the regions on a periodic basis (e.g., in accordance with a designated schedule). The optimizer may optimize a separate differential file for each successive period to include the changes that occurred during that period.

Figure 7:
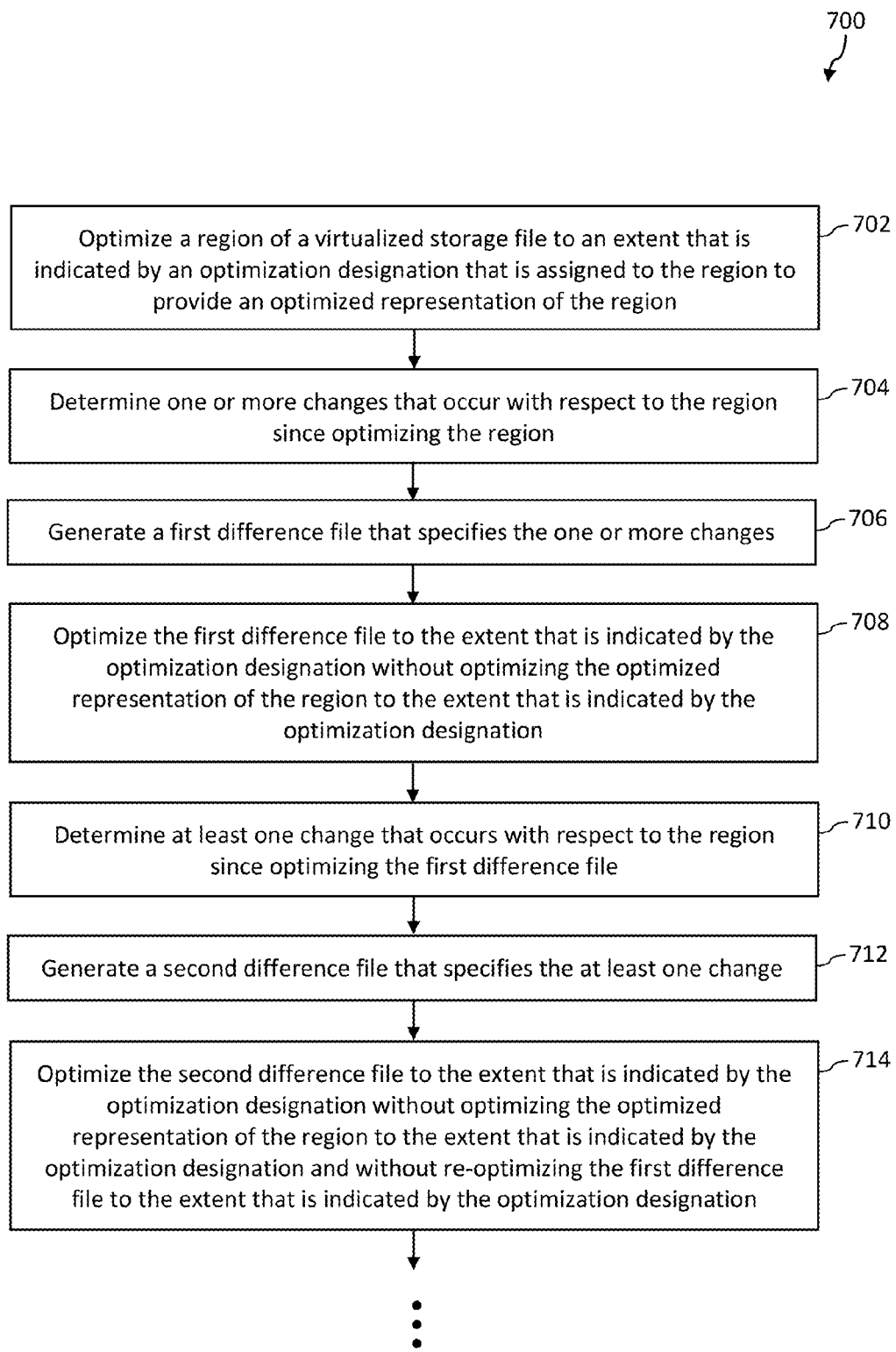

For instance, FIG. 7 depicts a flowchart 700 of an example method for optimizing (i.e., deduplicating) data using one or more difference files in accordance with an embodiment. Flowchart 700 may be performed by optimizer 104 of host device 100 shown in FIG. 1, for example. For illustrative purposes, flowchart 700 is described with respect to optimizer 300 shown in FIG. 3. Further structural and operational embodiments will be apparent to persons skilled in the relevant art(s) based on the discussion regarding flowchart 700.

As shown in FIG. 7, the method of flowchart 700 begins at step 702. In step 702, a region of a virtualized storage file is optimized to an extent that is indicated by an optimization designation that is assigned to the region to provide an optimized representation of the region. In an example implementation, optimization module 304 optimizes the region of the virtualized storage file.

At step 704, one or more changes are determined that occur with respect to the region since optimizing the region. In an example implementation, determination module 312 determines the one or more changes.

At step 706, a first difference file is generated that specifies the one or more changes. For instance, optimizing the region to provide the optimized representation of the region may trigger generation of the first difference file. In an example implementation, generation module 314 generates the first difference file.

At step 708, the first difference file is optimized to the extent that is indicated by the optimization designation without optimizing the optimized representation of the region to the extent that is indicated by the optimization designation. In an example implementation, optimization module 304 optimizes the first difference file.

At step 710, at least one change is determined that occurs with respect to the region since optimizing the first difference file. In an example implementation, determination module 312 determines the at least one change.

At step 712, a second difference file is generated that specifies the at least one change. For instance, optimizing the first difference file may trigger generation of the second difference file. In an example implementation, generation module 314 generates the second difference file.

At step 714, the second difference file is optimized to the extent that is indicated by the optimization designation without optimizing the optimized representation of the region to the extent that is indicated by the optimization designation and without re-optimizing the first difference file to the extent that is indicated by the optimization designation. In an example implementation, optimization module 304 optimizes the second difference file.

In some example embodiments, one or more steps 702, 704, 706, 708, 710, 712, and/or 714 of flowchart 700 may not be performed. Moreover, steps in addition to or in lieu of steps 702, 704, 706, 708, 710, 712, and/or 714 may be performed. For example, upon completion of step 714, the method of flowchart 700 may continue with generating and optimizing successive difference files that specify respective changes that occur with respect to the region. For instance, change(s) since the most recent optimization may be determined, another difference file may be generated that specifies the change(s), and that difference file may be optimized to the extent that is indicated by the optimization designation without optimizing any of the previously generated difference files and without optimizing the optimized representation of the region to the extent that is indicated by the optimization designation. These steps may be performed for successive difference files until the method of flowchart 700 is discontinued. The optimized representation of the region and the corresponding difference files may be combined to provide an updated optimized representation of the region that incorporates the changes that are specified by the difference files.

Figure 8:
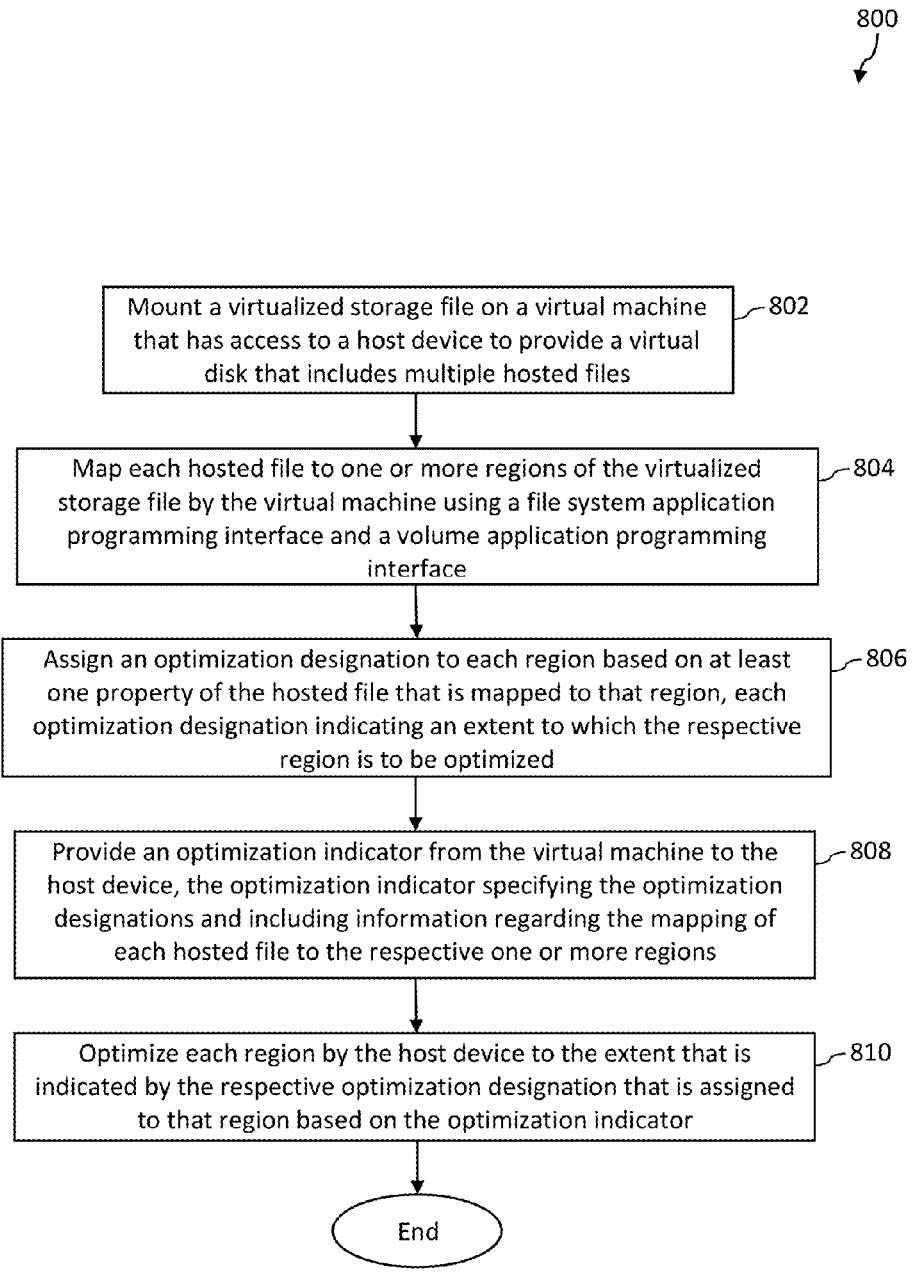

FIG. 8 depicts a flowchart 800 that shows an example way to implement the method described above with respect to FIG. 2 in accordance with an embodiment. Flowchart 800 may be performed by optimizer 104 of host device 100 shown in FIG. 1, for example. For illustrative purposes, flowchart 800 is described with respect to optimizer 300 shown in FIG. 3. Further structural and operational embodiments will be apparent to persons skilled in the relevant art(s) based on the discussion regarding flowchart 800.

As shown in FIG. 8, the method of flowchart 800 begins at step 802. In step 802, a virtualized storage file is mounted on a virtual machine that has access to a host device to provide a virtual disk that includes multiple hosted files. For instance, the virtual machine may be executing on the host device. In an example implementation, mounting module 306 mounts the virtualized storage file on the virtual machine that is executing on the host device. In accordance with this example implementation, mounting module 306 is implemented in the host device (e.g., host device 100).

At step 804, each hosted file is mapped to one or more regions of the virtualized storage file by the virtual machine using a file system application programming interface and a volume application programming interface. An application programming interface (API) is an interface that is implemented by a software module to enable the software module to interact with other software module(s). A file system API is an API through which an operating system may interface with a file system. A volume API is an API through which an operating system may interface with a volume that is associated with a physical or virtual disk. In an example implementation, mapping module 308 maps each hosted file to one or more regions of the virtualized storage file. In accordance with this example implementation, mapping module 308 is implemented in the virtual machine (e.g., virtual machine 112).

At step 806, an optimization designation is assigned to each region based on at least one property of the hosted file that is mapped to that region. Each optimization designation indicates an extent to which the respective region is to be optimized (i.e., deduplicated). In an example implementation, assignment module 302 assigns the optimization designations to the respective regions. In accordance with this example implementation, assignment module 302 is implemented in the virtual machine.

At step 808, an optimization indicator (a.k.a. a deduplication indicator) is provided from the virtual machine to the host device. The optimization indicator specifies the optimization designations (i.e., deduplication designations) and includes information regarding the mapping of each hosted file to the respective one or more regions. In an example implementation, indicator module 310 provides the optimization indicator from the virtual machine to the host device. In accordance with this example implementation, indicator module 310 is implemented in the virtual machine.

In an example embodiment, the optimization indicator does not include information regarding the mapping of each hosted file to the respective one or more regions. For example, step 804 may not be performed. In accordance with this example, information regarding the mapping of each hosted file to the respective one or more regions may not exist or may not be accessible.

At step 810, each region is optimized (i.e., deduplicated) by the host device to the extent that is indicated by the respective optimization designation that is assigned to that region based on the optimization indicator. In an example implementation, optimization module 304 optimizes each region based on the optimization indicator. In accordance with this example implementation, optimization module 304 is implemented in the host device.

In some example embodiments, one or more steps 802, 804, 806, 808, and/or 810 of flowchart 800 may not be performed. Moreover, steps in addition to or in lieu of steps 802, 804, 806, 808, and/or 810 may be performed.

Figure 9:
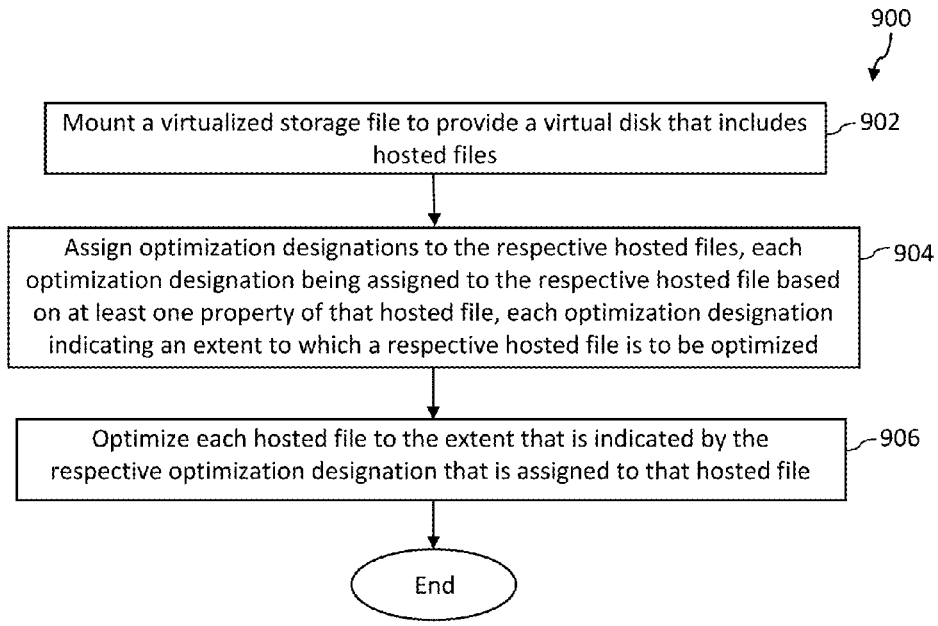

FIG. 9 depicts a flowchart 900 of another example method for optimizing (i.e., deduplicating) data in a virtualization environment in accordance with an embodiment. Flowcharts 900 may be performed by optimizer 104 of host device 100 shown in FIG. 1, for example. For illustrative purposes, flowchart 900 is described with respect to an optimizer 300 shown in FIG. 3. Further structural and operational embodiments will be apparent to persons skilled in the relevant art(s) based on the discussion regarding flowchart 900.

As shown in FIG. 9, the method of flowchart 900 begins at step 902. In step 902, a virtualized storage file is mounted to provide a virtual disk that includes hosted files. In an example implementation, mounting module 306 mounts the virtualized storage file.

At step 904, optimization designations (a.k.a. deduplication designations) are assigned to the respective hosted files. Each optimization designation is assigned to the respective hosted file based on at least one property of that hosted file. Each optimization designation indicates an extent to which a respective hosted file is to be optimized (i.e., deduplicated). The optimization designations may be assigned to the respective regions in accordance with a heuristic technique, though the scope of the example embodiments is not limited in this respect. In an example implementation, assignment module 302 assigns the optimization designations to the respective hosted files.

In an example embodiment, an optimization designation is assigned to each hosted file based on a number of times that the hosted file is accessed, a frequency with which the hosted file is accessed, a time at which the hosted file is most recently accessed, a number of times that the hosted file is modified, a frequency with which the hosted file is modified, a time at which the hosted file is most recently modified, a latency that is associated with accessing the hosted file, a classification of the hosted file, a format of the hosted file, whether the hosted file is configured to be used in a system boot operation with respect to a host device (e.g., host device 100) and/or a virtual machine (e.g., virtual machine 112), whether the hosted file is configured to be used to execute a virtual machine, whether the hosted file is a temporary file, and/or any combination thereof.

At step 906, each hosted file is optimized (i.e., deduplicated) to the extent that is indicated by the respective optimization designation that is assigned to that hosted file. In an example implementation, optimization module 304 optimizes each hosted file.

In some example embodiments, one or more steps 902, 904, and/or 906 of flowchart 900 may not be performed. Moreover, steps in addition to or in lieu of steps 902, 904, and/or 906 may be performed.

Figure 10:
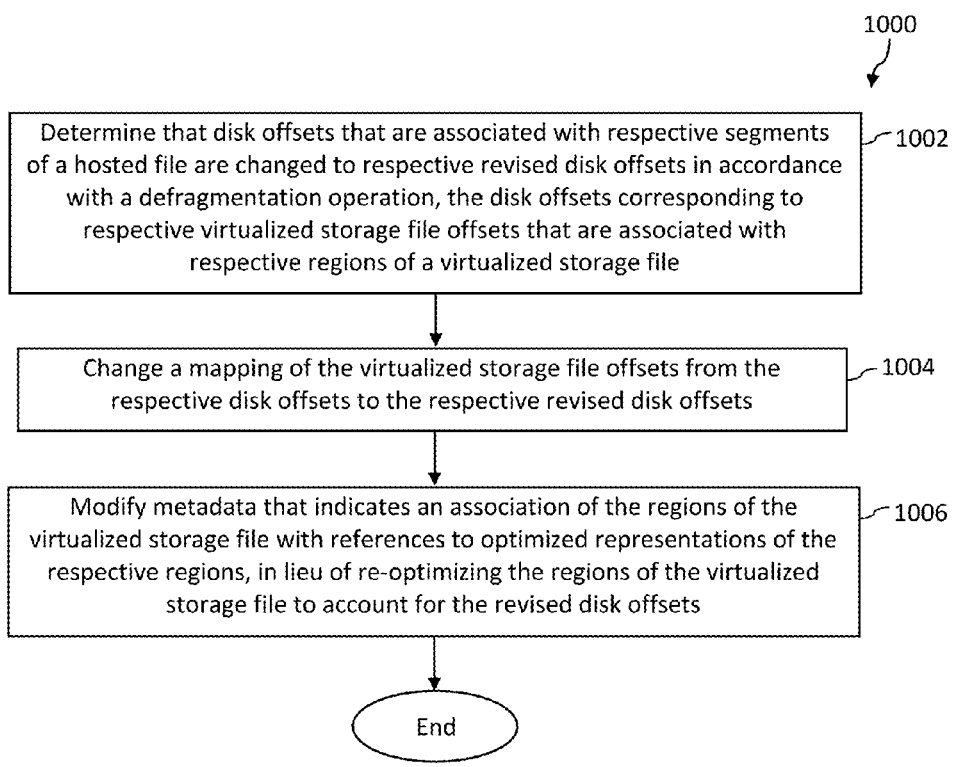
FIG. 10 depicts a flowchart of an example method for mapping virtualized storage file offsets to disk offsets in accordance with an embodiment.

FIG. 10 depicts a flowchart 1000 of an example method for mapping virtualized storage file offsets to disk offsets in accordance with an embodiment. Flowcharts 1000 may be performed by optimizer 104 of host device 100 shown in FIG. 1, for example. For illustrative purposes, flowchart 1000 is described with respect to optimizer 300 shown in FIG. 3. Further structural and operational embodiments will be apparent to persons skilled in the relevant art(s) based on the discussion regarding flowchart 1000.

As shown in FIG. 10, the method of flowchart 1000 begins at step 1002. In step 1002, a determination is made that disk offsets that are associated with respective segments of a hosted file are changed to respective revised disk offsets in accordance with a defragmentation operation. The disk offsets correspond to respective virtualized storage file offsets that are associated with respective regions of a virtualized storage file. For example, the defragmentation operation may change file system metadata to reflect that the disk offsets are changed to the respective revised disk offsets. In an example implementation, mapping module 308 determines that the disk offsets are changed to respective revised disk offsets. For instance mapping module 308 may monitor movement of the segments of the hosted file to determine that the disk offsets are changed to the respective revised disk offsets.

At step 1004, a mapping of the virtualized storage file offsets is changed from the respective disk offsets to the respective revised disk offsets. In an example implementation, mapping module 308 changes the mapping of the virtualized storage file from the respective disk offsets to the respective revised disk offsets.

At step 1006, metadata that indicates an association of the regions of the virtualized storage file with references to optimized representations of the respective regions is modified, in lieu of re-optimizing the regions of the virtualized storage file to account for the revised disk offsets. For example, deduplication of the virtualized storage file may involve "chunking" the virtualized storage file to provide the references to the optimized representations of the respective regions of the virtualized storage file. Such references may be referred to as "chunks". In accordance with this example, the deduplication may create metadata that links the regions of the virtualized storage file to their respective chunks. Defragmentation changes the locations of the regions in the virtualized storage file. The virtualized storage file offsets change accordingly. In accordance with this example, the metadata may therefore be modified as set forth in step 1006. It will be apparent to persons skilled in the relevant art(s) that, in some embodiments, re-optimization of the regions to account for the revised disk offsets may be avoided by modifying the metadata that indicates the association of the regions with the references. In an example implementation, optimization module 304 modifies the metadata that indicates the association of the regions with the references.

Assignment module 302, optimization module 304, mounting module 306, mapping module 308, indicator module 310, determination module 312, generation module 314, snapshot mounter 602, volume analyzer 604, offset mapper 606, and review module 608 may be implemented in hardware, software, firmware, or any combination thereof. For example, assignment module 302, optimization module 304, mounting module 306, mapping module 308, indicator module 310, determination module 312, generation module 314, snapshot mounter 602, volume analyzer 604, offset mapper 606, and/or review module 608 may be implemented as computer program code configured to be executed in one or more processors. In another example, assignment module 302, optimization module 304, mounting module 306, mapping module 308, indicator module 310, determination module 312, generation module 314, snapshot mounter 602, volume analyzer 604, offset mapper 606, and/or review module 608 may be implemented as hardware logic/electrical circuitry.

Figure 11:
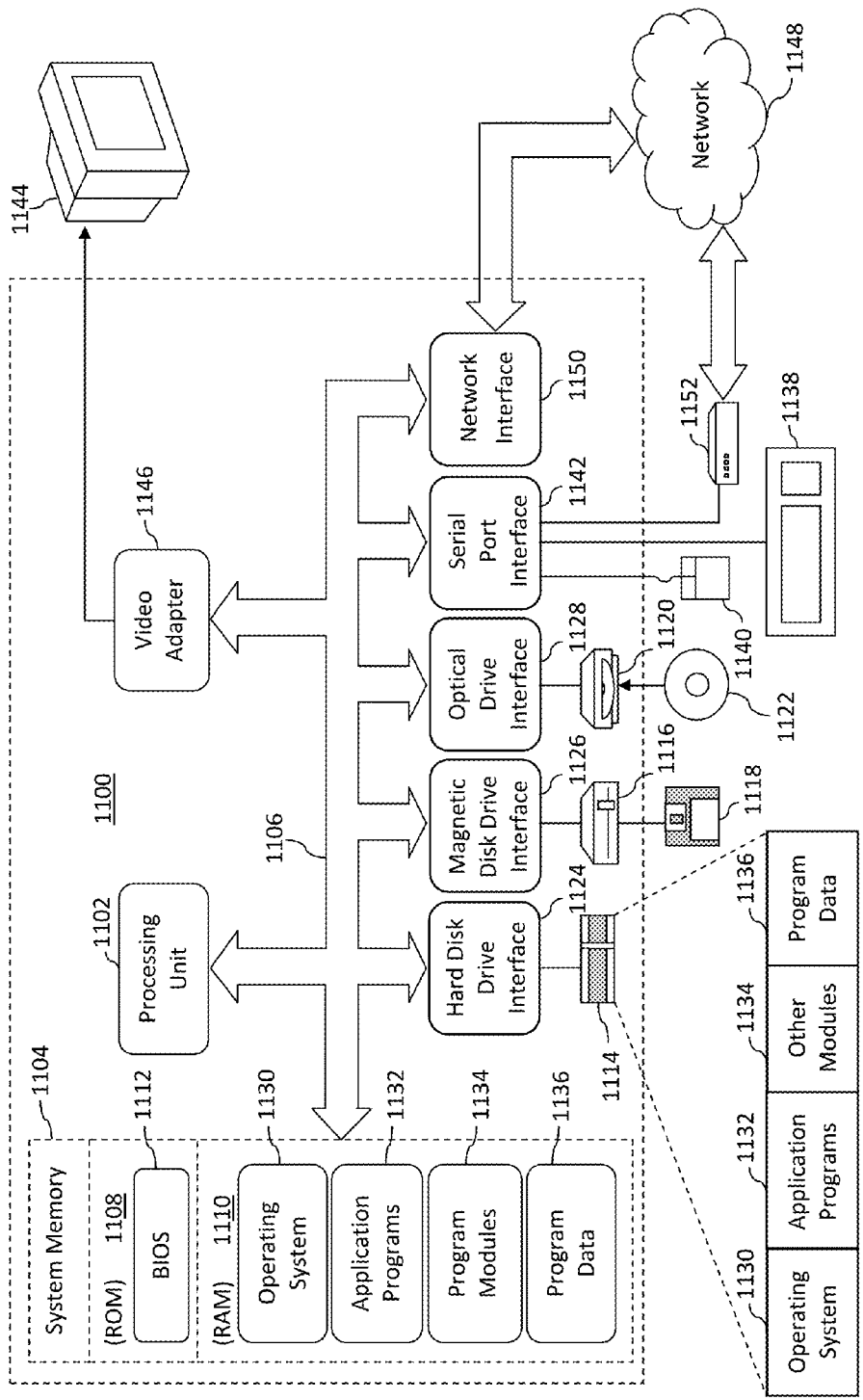
FIG. 11 depicts an example computer in which embodiments may be implemented.

FIG. 11 depicts an example computer 1100 in which embodiments may be implemented. Host device 100 shown in FIG. 1 (or any one or more subcomponents thereof shown in FIGS. 3 and 6) may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing assignment module 302, optimization module 304, mounting module 306, mapping module 308, indicator module 310, determination module 312, generation module 314, snapshot mounter 602, volume analyzer 604, offset mapper 606, review module 608, flowchart 200 (including any step of flowchart 200), flowchart 400 (including any step of flowchart 400), flowchart 500 (including any step of flowchart 500), flowchart 700 (including any step of flowchart 700), flowchart 800 (including any step of flowchart 800), flowchart 900 (including any step of flowchart 900), and/or flowchart 1000 (including any step of flowchart 1000), as described herein.

A user may enter commands and information into the computer 1100 through input devices such as keyboard 1138 and pointing device 1140. Other input devices (not shown) may include a microphone, joystick, game pad, satellite dish, scanner, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable medium" are used to generally refer to media such as the hard disk associated with hard disk drive 1114, removable magnetic disk 1118, removable optical disk 1122, as well as other media such as flash memory cards, digital video disks, random access memories (RAMs), read only memories (ROMs), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system to indicate an extent to which each hosted file that is included in a virtual disk is to be optimized, the system comprising:

at least one element including at least one of (a) one or more processors, (b) hardware logic, or (c) electrical circuitry, the at least one element configured to mount a virtualized storage file to provide a virtual disk that includes a plurality of hosted files, the at least one element configured to review an on-disk format of a file system that is associated with the virtual disk to obtain metadata that indicates that each hosted file of the plurality of hosted files corresponds to one or more of a plurality of virtualized storage file offsets in the virtualized storage file, the plurality of virtualized storage file offsets corresponding to respective regions in a plurality of regions of the virtualized storage file, the at least one element configured to assign a plurality of optimization designations to the plurality of respective hosted files, each optimization designation assigned to the respective hosted file based on at least one property of that hosted file, each optimization designation indicating an extent to which the respective hosted file is to be optimized, the at least one element configured to mount a snapshot of the virtualized storage file to provide a volume that is arranged in accordance with the file system, the file system indicating a plurality of disk offsets that corresponds to the plurality of hosted files, the at least one element configured to analyze the volume to determine the plurality of disk offsets, the at least one element configured to map the plurality of disk offsets to the plurality of virtualized storage file offsets in the virtualized storage file, the at least one element configured to determine whether one or more disk offsets of the plurality of disk offsets are changed to one or more respective revised disk offsets, the one or more disk offsets corresponding to one or more specified virtualized storage file offsets of the plurality of virtualized storage file offsets, the at least one element configured to change a mapping of the one or more specified virtualized storage file offsets from the one or more respective disk offsets to the one or more respective revised disk offsets in response to a determination that the one or more disk offsets are changed to the one or more respective revised disk offsets.

2. The system of claim 1, wherein the plurality of disk offsets corresponds to the plurality of respective hosted files; and wherein the at least one element is configured to map the plurality of disk offsets to the plurality of respective virtualized storage file offsets in the virtualized storage file.

3. The system of claim 1, wherein the at least one element is configured to modify metadata that indicates an association of at least one or more regions of the virtualized storage file offsets, with one or more references to one or more optimized representations of the one or more regions, in lieu of re-optimizing the one or more regions to account for the one or more revised disk offsets.

4. The system of claim 1, wherein the at least one elements is configured to assign a first optimization designation to a first hosted file of the plurality of hosted files based at least in part on one or more types of data that are stored in the first hosted file.

5. The system of claim 1, wherein the at least one element is configured to assign a first optimization designation to a first hosted file of the plurality of hosted files based at least in part on a classification of the first hosted file.

6. The system of claim 1, wherein the at least one element is configured to assign a first optimization designation to a first hosted file of the plurality of hosted files based at least in part on a format of the first hosted file.

7. The system of claim 1, wherein the at least one element is configured to assign a first optimization designation to a first hosted file of the plurality of hosted files based at least in part on an intended use of the first hosted file.

8. The system of claim 1, wherein the at least one element is configured to assign a first optimization designation to a first hosted file of the plurality of hosted files based at least in part on an access pattern of the first hosted file.

9. A method of indicating an extent to which each hosted file that is included in a virtual disk is to be optimized, the method comprising:

mounting a virtualized storage file, using at least one element that includes at least one of (a) one or more processors, (b) physical hardware, or (c) electrical circuitry, to provide a virtual disk that includes a plurality of hosted files;

reviewing an on-disk format of a file system that is associated with the virtual disk, using the at least one element, to obtain metadata that indicates that each hosted file of the plurality of hosted files corresponds to one or more of a plurality of virtualized storage file offsets in the virtualized storage file, the plurality of virtualized storage file offsets corresponding to respective regions in a plurality of regions of the virtualized storage file;

assigning a plurality of optimization designations to the plurality of respective hosted files using the at least one element, each optimization designation assigned to the respective hosted file based on at least one property of that hosted file, each optimization designation indicating an extent to which the respective hosted file is to be optimized;

mounting a snapshot of the virtualized storage file to provide a volume that is arranged in accordance with the file system, the file system indicating a plurality of disk offsets that corresponds to the plurality of hosted files;

analyzing the volume to determine the plurality of disk offsets;

mapping the plurality of disk offsets to the plurality of virtualized storage file offsets in the virtualized storage file;

determining that one or more disk offsets of the plurality of disk offsets are changed to one or more respective revised disk offsets, the one or more disk offsets corresponding to one or more specified virtualized storage file offsets of the plurality of virtualized storage file offsets; and changing a mapping of the one or more specified virtualized storage file offsets from the one or more respective disk offsets to the one or more respective revised disk offsets.

10. The method of claim 9, wherein the plurality of disk offsets corresponds to the plurality of respective hosted files; and wherein mapping the plurality of disk offsets comprises:
mapping the plurality of disk offsets to the plurality of respective virtualized storage file offsets in the virtualized storage file.

11. The method of claim 10, further comprising:
modifying metadata that indicates an association of at least one or more regions of the plurality of regions of the virtualized storage file, which correspond to the one or more specified virtualized storage file offsets, with one or more references to one or more optimized representations of the one or more regions, in lieu of re-optimizing the one or more regions to account for the one or more revised disk offsets.

12. The method of claim 10, wherein assigning the plurality of optimization designations to the plurality of respective hosted files comprises:
assigning a first optimization designation to a first hosted file of the plurality of hosted files based at least in part on one or more types of data that are stored in the first hosted file.

13. The method of claim 10, wherein assigning the plurality of optimization designations to the plurality of respective hosted files comprises:
assigning a first optimization designation to a first hosted file of the plurality of hosted files based at least in part on a classification of the first hosted file.

14. The method of claim 10, wherein assigning the plurality of optimization designations to the plurality of respective hosted files comprises:
assigning a first optimization designation to a first hosted file of the plurality of hosted files based at least in part on a format of the first hosted file.

15. The method of claim 10, wherein assigning the plurality of optimization designations to the plurality of respective hosted files comprises:
assigning a first optimization designation to a first hosted file of the plurality of hosted files based at least in part on an intended use of the first hosted file.

16. The method of claim 10, wherein assigning the plurality of optimization designations to the plurality of respective hosted files comprises:
assigning a first optimization designation to a first hosted file of the plurality of hosted files based at least in part on an access pattern of the first hosted file.

17. A system to indicate an extent to which each hosted file that is included in a virtual disk is to be optimized, the system comprising:

at least one element including at least one of (a) one or more processors, (b) hardware logic, or (c) electrical circuitry, the at least one element configured to mount a virtualized storage file to provide a virtual disk that includes a plurality of hosted files, the at least one element configured to assign a plurality of optimization designations to the plurality of respective hosted files, each optimization designation assigned to the respective hosted file based on at least one property of that hosted file, each optimization designation indicating an extent to which the respective hosted file is to be optimized, the at least one element configured to assign at least one optimization designation of the plurality of optimization designations to at least one respective hosted file of the plurality of hosted files to indicate an extent to which the at least one hosted file is to be deduplicated based on whether the at least one respective hosted file is configured to be used in a system boot operation, the at least one optimization designation indicating that the at least one hosted file is not to be optimized or is to be optimized to a relatively lesser extent based on the at least one hosted file being configured to be used in the system boot operation.

18. The system of claim 17, wherein the at least one element is configured to assign at least one second optimization designation to at least one respective second hosted file of the plurality of hosted files based at least in part on one or more types of data that are stored in the at least one second hosted file.

19. The system of claim 17, wherein the at least one optimization designation indicates that the at least one hosted file is not to be deduplicated based on the at least one hosted file being configured to be used in the system boot operation.

20. The system of claim 17, wherein the at least one optimization designation indicates that the at least one hosted file is to be optimized to a relatively lesser extent based on the at least one hosted file being configured to be used in the system boot operation.

\* \* \* \* \*